United States Patent
Pfeiffer

(10) Patent No.: US 10,705,194 B2
(45) Date of Patent: Jul. 7, 2020

(54) AUTOMATED DETECTION OF SENSOR MISCALIBRATION

(71) Applicant: Zoox, Inc., Menlo Park, CA (US)

(72) Inventor: David Pfeiffer, Menlo Park, CA (US)

(73) Assignee: Zoox, Inc., Foster City, CA (US)

(*) Notice: Subject to any disclaimer, the term of this patent is extended or adjusted under 35 U.S.C. 154(b) by 167 days.

(21) Appl. No.: 15/927,315

(22) Filed: Mar. 21, 2018

(65) Prior Publication Data

US 2019/0293772 A1 Sep. 26, 2019

(51) Int. Cl.
| | |
|---|---|
| *G01S 7/497* | (2006.01) |
| *G05D 1/02* | (2020.01) |
| *G01S 17/08* | (2006.01) |
| *G01S 17/42* | (2006.01) |
| *G01S 17/931* | (2020.01) |
| *G05D 1/00* | (2006.01) |
| *G01S 17/87* | (2020.01) |

(52) U.S. Cl.
CPC ............ *G01S 7/4972* (2013.01); *G01S 17/08* (2013.01); *G01S 17/42* (2013.01); *G01S 17/87* (2013.01); *G01S 17/931* (2020.01); *G05D 1/0088* (2013.01); *G05D 1/024* (2013.01); *G05D 2201/0213* (2013.01)

(58) Field of Classification Search
CPC ........ G01S 7/4972; G01S 17/08; G01S 17/42; G01S 17/87; G01S 17/936; G05D 1/0088; G05D 1/024
See application file for complete search history.

(56) References Cited

U.S. PATENT DOCUMENTS

| | | | | |
|---|---|---|---|---|
| 2005/0062615 | A1* | 3/2005 | Braeuchle | B60K 31/0008 340/903 |
| 2008/0023927 | A1* | 1/2008 | Kim | B60G 17/0155 280/5.514 |

(Continued)

FOREIGN PATENT DOCUMENTS

| | | |
|---|---|---|
| DE | 102007008798 A1 | 9/2008 |
| DE | 102015005961 A1 | 2/2016 |

OTHER PUBLICATIONS

Kar, et al, "CALIPSO lidar calibration at 532 nm: version 4 nighttime algorithm," Atmospheric Measurement Techniques, vol. 11, No. 3, Mar. 14, 2018, pp. 1459-1479.

(Continued)

*Primary Examiner* — Hussein Elchanti
(74) *Attorney, Agent, or Firm* — Lee & Hayes, P.C.

(57) ABSTRACT

A vehicle control system includes various sensors. The system can include, among others, LIDAR, RADAR, SONAR, cameras, microphones, GPS, and infrared systems for monitoring and detecting environmental conditions. In some implementations, one or more of these sensors may become miscalibrated. Using data collected by the sensors, the system can detect a miscalibrated sensor and generate an indication that one or more sensors have become miscalibrated. For example, data captured by a sensor can be processed to determine an average height represented by the sensor data and compared to an average height of data captured by other sensors. Based on a difference in heights, an indication can be generated identifying a miscalibrated sensor.

20 Claims, 7 Drawing Sheets

(56) References Cited

U.S. PATENT DOCUMENTS

| | | | |
|---|---|---|---|
| 2014/0379254 A1* | 12/2014 | Miksa | G01C 21/32 |
| | | | 701/450 |
| 2015/0291177 A1* | 10/2015 | Lee | B60W 40/06 |
| | | | 73/146 |
| 2016/0253566 A1* | 9/2016 | Stein | G06K 9/00791 |
| | | | 348/148 |
| 2016/0356594 A1* | 12/2016 | Sorenson | G01S 17/42 |
| 2017/0088134 A1* | 3/2017 | Liu | B60W 30/0956 |
| 2017/0219338 A1* | 8/2017 | Brown | G01B 11/002 |
| 2018/0015801 A1* | 1/2018 | Mohamed | B60G 17/0165 |
| 2018/0283861 A1* | 10/2018 | Kourogi | G01C 5/06 |

OTHER PUBLICATIONS

PCT Search Report and Written Opinion dated Jun. 12, 2019 for PCT Application No. PCT/US2019/022863, 16 pages.

* cited by examiner

AUTOMATED DETECTION OF SENSOR MISCALIBRATION

BACKGROUND

Autonomous vehicle systems can use sensors to capture data of an environment. During operation or otherwise, sensors may become miscalibrated. Miscalibrated sensors may capture inaccurate data possibly leading towards reduced safety outcomes. Additionally, detecting a miscalibrated sensor may require extensive diagnosis while also consuming a significant amount of time, cost, and resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes techniques for detecting a miscalibrated sensor for an autonomous vehicle. Autonomous vehicles may include a plurality of sensors to capture data corresponding to an environment of the vehicle. The system may use LIDAR sensors to capture data in the environment that correspond to, for example, height values of surfaces in the environment. In some instances, based at least in part on image data, segmentation data, classification data, or GPS data, or any combination thereof, a portion of the captured data may be associated with a ground surface. A calibration grid can be used to partition the captured data into partitions for calibration.

The system may select a single partition of the calibration grid to use as a reference for comparing various sensor data that corresponds to the partition. For example, sensor data from the multiple sensors may have a plurality of height values (e.g., values which correspond to a dimension) that correspond to the partition. The system may calculate average height values associated with the multiple sensors. In some instances, average height values for a single sensor can be compared relative to average height values for a group of sensors to determine whether a sensor of a plurality of sensors is miscalibrated.

The miscalibrated sensor detection techniques discussed herein can improve a functioning of a computing device by reducing the amount of computing resources required to detect the miscalibrated sensor, while maintaining the accuracy of detection. In some instances, reducing the amount of data used in the calculation can reduce processing time, reduce memory usage, and maintain the accuracy of detecting a miscalibrated sensor. As can be understood, maintaining accuracy of detecting a miscalibrated sensor can improve safety outcomes and reduce the collection of possibly inaccurate sensor data when left undetected. Further, reducing the amount of data needed for miscalibration detection can reduce network congestion by reducing the amount of data transferred between a computing device and the vehicle. These and other improvements to the functioning of the computer are discussed herein.

The techniques described herein can be implemented in a number of ways. Example implementations are provided below with reference to the following figures. Although discussed in the context of an autonomous vehicle, the techniques described herein can be applied to a variety of systems requiring calibration of sensors prior to and/or during use, and is not limited to autonomous vehicles. In another example, the methods, apparatuses, and systems may be utilized in an aviation or nautical context. Additionally, the techniques described herein may be used with real data (e.g., captured using sensor(s)), simulated data (e.g., generated by a simulator), or any combination of the two.

Figure 1:
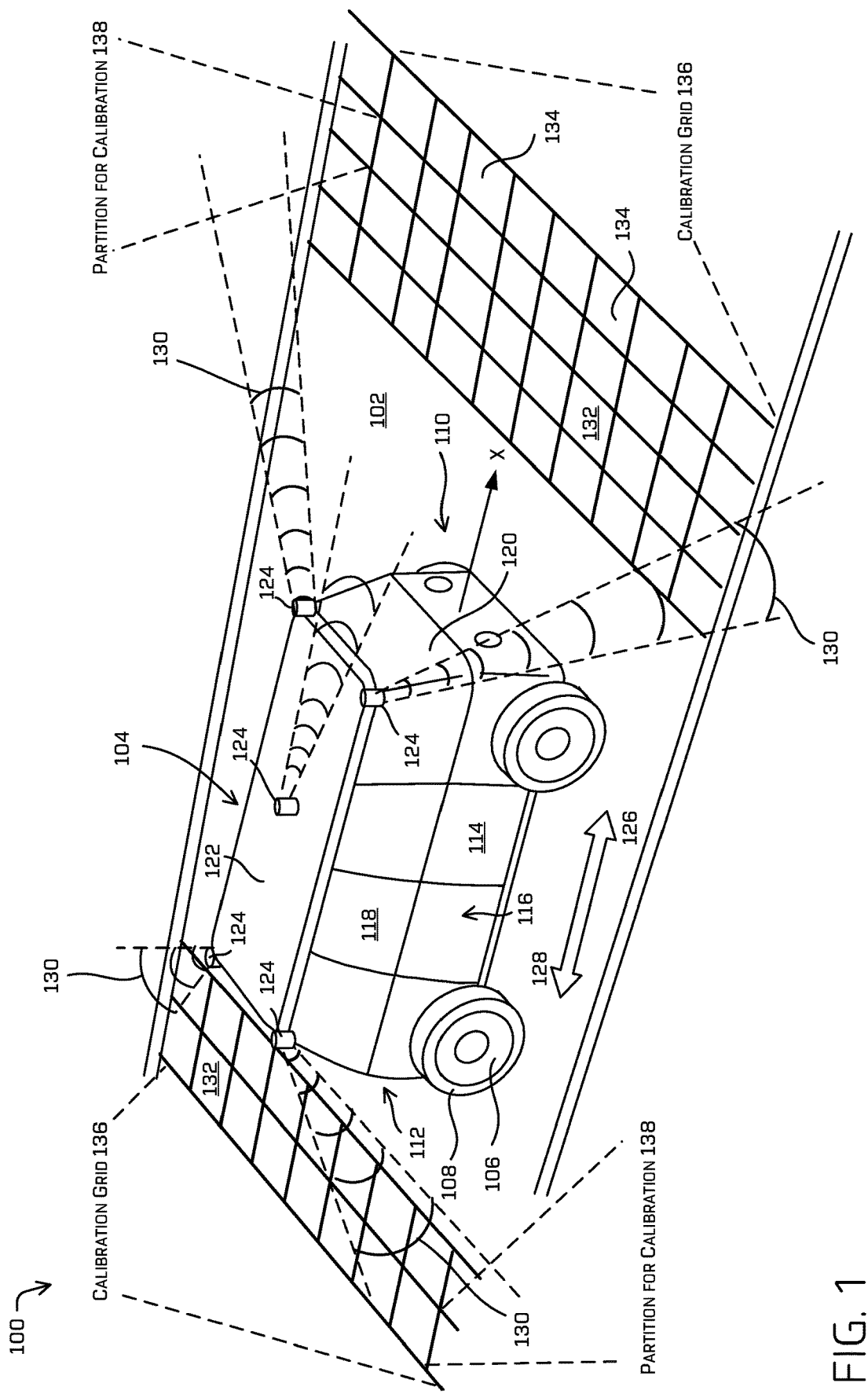
FIG. 1 is a perspective view of an example vehicle including illustrative sensors capturing data in an environment, as well as a calibration grid, in accordance with some examples of the present disclosure.

FIG. 1 shows an example of an automated vehicle system 100 configured to travel across an area 102 (e.g., a road surface), for example, to transport people and/or cargo from a first location to a second location. For the purpose of illustration, the system 100 can comprise a vehicle 104, which may be an autonomous vehicle configured to operate according to a Level 5 classification issued in 2016 by the U.S. National Highway Traffic Safety Administration, which describes a vehicle capable of performing all safety critical functions for the entire trip, with the driver (or occupant) not being expected to control the vehicle at any time. In that case, since the vehicle 104 may be configured to control all functions from start to stop, including all parking functions, it may be unoccupied. This is merely an example, and the techniques described herein may be incorporated into any ground-borne vehicle, including those ranging from vehicles that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions. As discussed below, in some cases, when occupied, the system 100 may limit acceleration based on passenger preferences, for example, for one or more passengers in the vehicle.

The example vehicle 104 shown in FIG. 1 is an automobile having four wheels 106 and respective tires 108 for each of the wheels 106. Other types and configurations of vehicles are contemplated, such as, for example, vans, sport utility vehicles, crossover vehicles, trucks, buses, agricultural vehicles, and construction vehicles. The vehicle 104 may be powered by one or more internal combustion engines, one or more batteries and electric motors, hydrogen fuel cells, or any combination thereof. In addition, although the example vehicle 104 has four wheels, the systems and methods described herein may be incorporated into vehicles having fewer or a greater number of wheels, tires, and/or tracks. The example vehicle 104 has four-wheel steering and may operate generally with equal performance characteristics in all directions, for example, such that a first end 110 of the vehicle 104 is the front end of the vehicle 104 when traveling in a first direction 126, and such that the first end 110 becomes the rear end of the vehicle 104 when traveling in the opposite, second direction 128, as shown in FIG. 1. Similarly, a second end 112 of the vehicle 104 is the front end of the vehicle 104 when traveling in the second direction 128, and such that the second end 112 becomes the rear end of the vehicle 104 when traveling in the opposite, first direction 126. These example characteristics may facilitate greater maneuverability, for example, in small spaces or crowded environments, such as parking lots and urban areas.

The example vehicle 104 shown in FIG. 1 includes one or more doors 114 on each side 116 of the vehicle 104 for facilitating entry and exit of occupants and cargo to and from an interior space 118 of the vehicle 104. The systems and methods described herein may be incorporated into vehicles having fewer or a greater number of doors. The vehicle 104 shown in FIG. 1 includes a windshield 120 and a roof 122 extending substantially (e.g., almost entirely) between the first end 110 and second end 112 of the vehicle 104. In some examples, the vehicle 104 may not include a windshield. Because the example vehicle 104 is a Level 5 autonomous vehicle, a windshield is not necessary. In some examples, the vehicle 104 may include a windshield 120, however, regardless of whether the vehicle 104 is configured to be autonomous or manually controlled by a driver. In some examples, at least a portion of the roof 122 may include one more solar cells configured to supply electric energy to the vehicle 104 for powering one or more electrically powered systems of the vehicle 104.

In the example shown in FIG. 1, the system 100 can comprise a plurality of sensors 124, which may be RADAR sensors, LIDAR sensors, SONAR sensors, image sensors, microphones, or any combination thereof, mounted on the vehicle 104. The vehicle 104 may also include any number and type of sensors and is not limited to the examples provided. The sensors 124, may be arranged in a predetermined pattern, for example, in order to provide a desired area of coverage of the area 102 proximate the vehicle 104. In some examples, as shown, the sensors 124 can be disposed in a pattern that enables approximately 360-degree coverage around the vehicle 104. This can enable the vehicle 104 to detect objects regardless of which direction 126, 128 the vehicle 104 is traveling. This can also enable the system 100 to detect objects approaching from the sides of the vehicle 104 (e.g., a dog, or other animal, running into the street). Other patterns and arrangements of the sensors 124 are contemplated.

As shown in FIG. 1, the sensors 124 may be mounted to a portion of the vehicle 104 that provides a line-of-site view of a portion of the area 102 around the vehicle 104, with at least a portion of the sensors 124 pointed in the direction of travel. As shown, each example sensors 124 can be mounted to a portion of the roof 122 approaching the upper edge of a windshield 120 or on top of the roof 122. The sensors 124 may be mounted at a location generally corresponding to the upper edge of the windshield 120. In examples in which the sensors 124 are mounted inside the windshield, any distortion of the data resulting from the windshield may be corrected, for example, via lenses or algorithms configured to correct the data. If the vehicle 104 were to include two windshields due to being bi-directional (like the example vehicle 104), each sensor 124 can be mounted at a location generally corresponding to the upper edge of the windshield 120.

Although the example sensors 124 shown are mounted to the roof 122, one or more of the sensors 124 can be mounted to other portions of the vehicle 104. For example, one or more of the sensors 124 can be mounted to the first and/or second end 110, 112 of the vehicle 104, for example, at a location generally corresponding to the location of a bumper of a conventional car. According to some examples, sensors 124 may also be mounted to capture data of the area 102 in the paths of each tire 108, or on each side of the vehicle 104.

According to some examples, one or more of the sensors 124 may be mounted in fixed manner, for example, so that data captured from the sensors 124 are captured from a constant orientation 130 relative to the vehicle 104. In such examples, the data would always be captured from the same angle relative to the vehicle 104 in both the vertical and lateral directions.

According to some examples, one or more of the sensors 124 may be mounted such that the orientation 130 of the sensors 124 can be changed relative to the vehicle 104 in the vertical and/or lateral direction. In other examples, one or more sensors 124 may continually rotate or oscillate such that the orientation 130 of the sensors is not fixed and may continually sweep the area 102 relative to the vehicle 104.

In some examples, the sensors 124 may be configured to rotate in order to change orientation. For example, if the vehicle 104 is traveling at a higher speed or based on certain environmental conditions, the sensors 124 may be aimed farther beyond the front of the vehicle 104, so that there is relatively more time for the vehicle 104 to respond to the data obtained by the sensors 124. Conversely, if the vehicle 104 is traveling at a relatively slower speed and/or in a densely populated, or otherwise congested area, or based on other environment conditions, the sensors 124 may be aimed closer to the front of the vehicle 104. In some examples, the sensors 124 can be mounted to permit one or more of these changes in orientation.

In the example shown in FIG. 1, the system 100 may determine a portion of area 102 as a ground surface 132 (e.g., an area proximate the vehicle 104 which is approximately planar and/or lies in a plane parallel with the vehicle). For example, in some instances, data segmentation techniques may assist in determining the portion of area 102 associated with a ground surface 132. The system 100 may capture data, segment the data, and/or associate other sensor data with the segmented data. A classifier may receive sensor data to classify at least a portion of the data as the ground surface 132.

In some instances, the system 100 may use GPS data and associate the sensor data with the GPS data. Using both the GPS data and the sensor data, the system 100 may determine a region associated with a ground surface 132 of the environment.

In some examples, the system 100 may assume that portions of the area 102 immediately proximate the vehicle are both planar and parallel to the vehicle and use such portions as ground surface 132.

According to some examples, the system 100 may overlay or otherwise associate a calibration grid 136 onto the region associated with a ground surface 132. The calibration grid 136 may partition data that is received from the one or more sensors and that is associated with the ground surface 132 into one or more partitions for calibration 138. The partitions for calibration 138 may include or may otherwise be associated with region data 134. The region data 134 may comprise a portion of the sensor data associated with the partition. Although depicted in FIG. 1 as existing ahead of and behind vehicle 104 for illustrative purposes, it is understood that such partitions may extend in all directions proximate the vehicle 104 and need not necessarily be contiguous.

Figure 2:
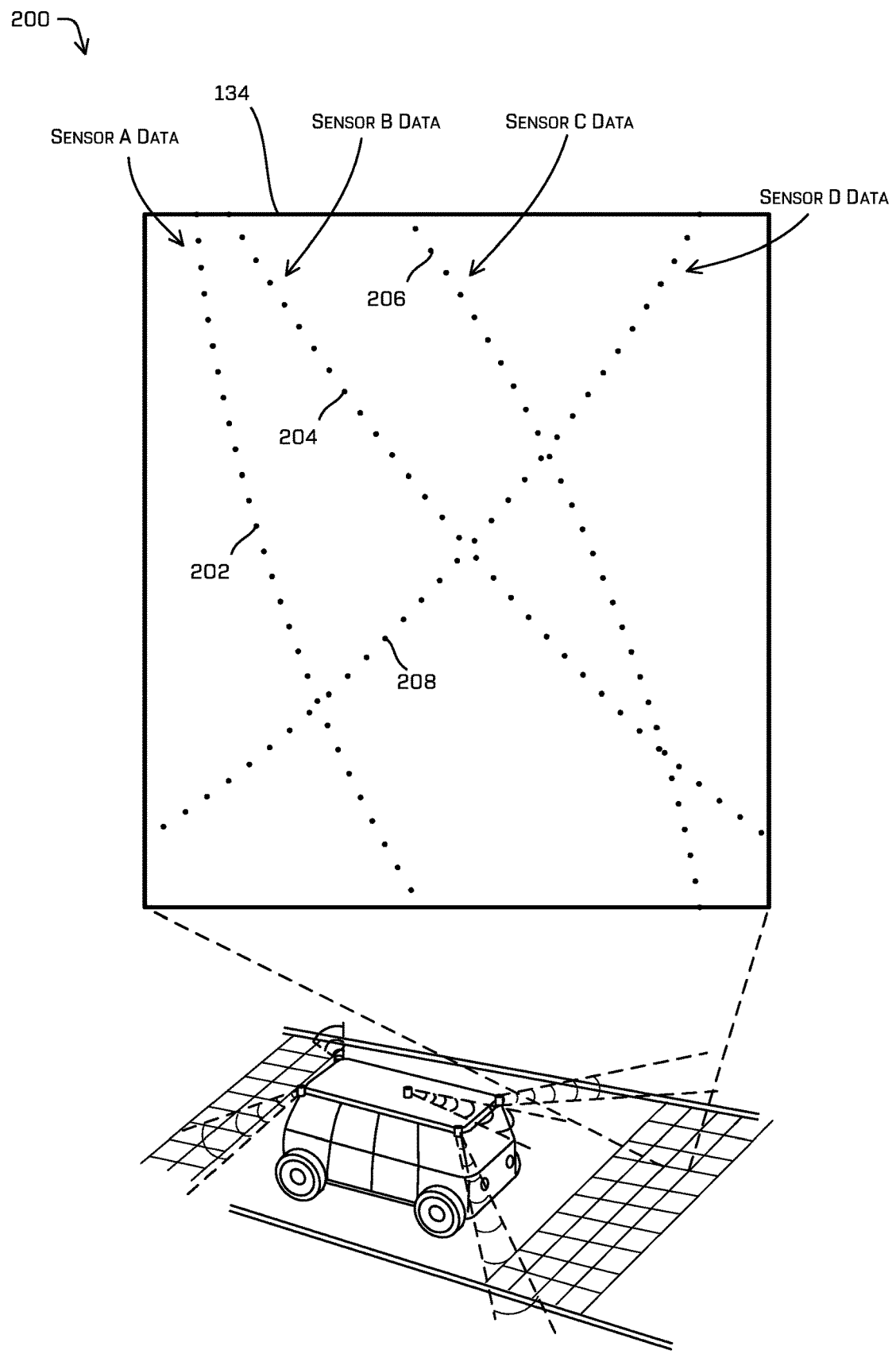
FIG. 2 depicts captured sensor data represented in a partition for calibration.

FIG. 2 shows an example graphical representation of a portion of sensor data 200. The region data 134 may include a plurality of data points that are associated with a partition that is associated with a portion of the ground surface 132. Each set of data points 202, 204, 206, and 208 (e.g., which may be referred to as a sweep for those sensors which rotate as they acquire data) is associated with a sensor 124 where each data point indicates, for example, a height value. Thus, for purposes of illustration, FIG. 2 illustrates sensor data from four different sensors 124 (e.g., Sensor A, Sensor B, Sensor C, and Sensor D). It can be understood that the region data 134 may include sensor data associated with any number of sensors, and is not limited to the example discussed herein.

In some instances, the system 100 may select a partition prior to checking the region data 134 associated with the partition. For example, the system 100 may check for a minimum number of data points associated with the partition. As another example, the system 100 may check for a minimum number of sensors 124 associated with the partition (e.g., a number of sensors 124 having sensor data associated with the partition and/or otherwise have a field of view that would capture the partition). As yet another example, the system 100 may check for a minimum number of data points associated with a sensor 124 associated with the partition. Put in another way, the system 100 may require a minimum number of data points per set 202, 204, 206, and 208. Thus, the system 100 may select a partition and then perform a variety of checks on the region data 134 associated with the partition. In some instances, the one or more checks to determine a threshold amount of data may be performed prior to selecting a partition for the detection operations discussed herein.

Figure 3A:
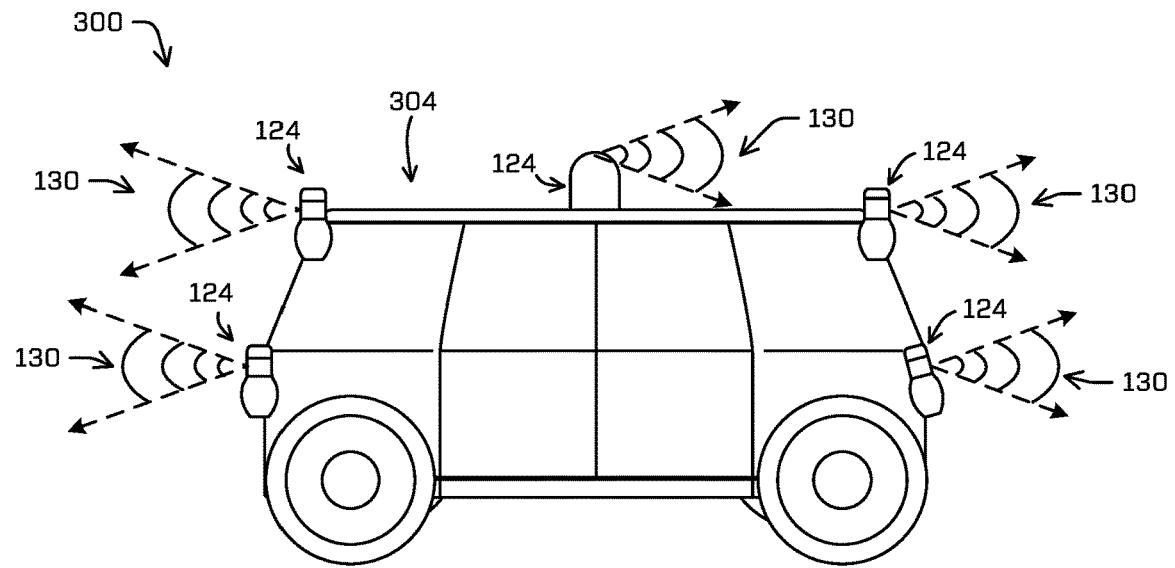
FIG. 3A depicts a side view of an example vehicle having multiple sensors mounted to the vehicle.

FIG. 3A depicts a side view 300 of an example vehicle 304 having multiple sensors 124 mounted to the vehicle 304. As shown in the side view 300, the vehicle 304 may include any number of sensors 124 in any combination or configuration. For example, the vehicle 304 includes at least sensors 124. In some instances, the sensors 124 may comprise RADAR sensors, LIDAR sensors, SONAR sensors, image sensors, microphones, or any combination thereof. The vehicle 304 may also include any number and type of sensors and is not limited to the examples provided. Additionally, as shown in the side view 300 and as described above, sensors 124 may be mounted such that orientation 130 is fixed relative to the vehicle 304. According to some examples, sensors 124 may also be mounted such that orientation 130 can be changed relative to the vehicle 304. In some examples, sensors 124 may be configured to change orientation 130 depending, for example, vehicle speed or environmental conditions. In some examples, sensors 124 may rotate and/or oscillate such that orientation 130 is not fixed and may continually sweep an area relative to the vehicle 304.

Figure 3B:
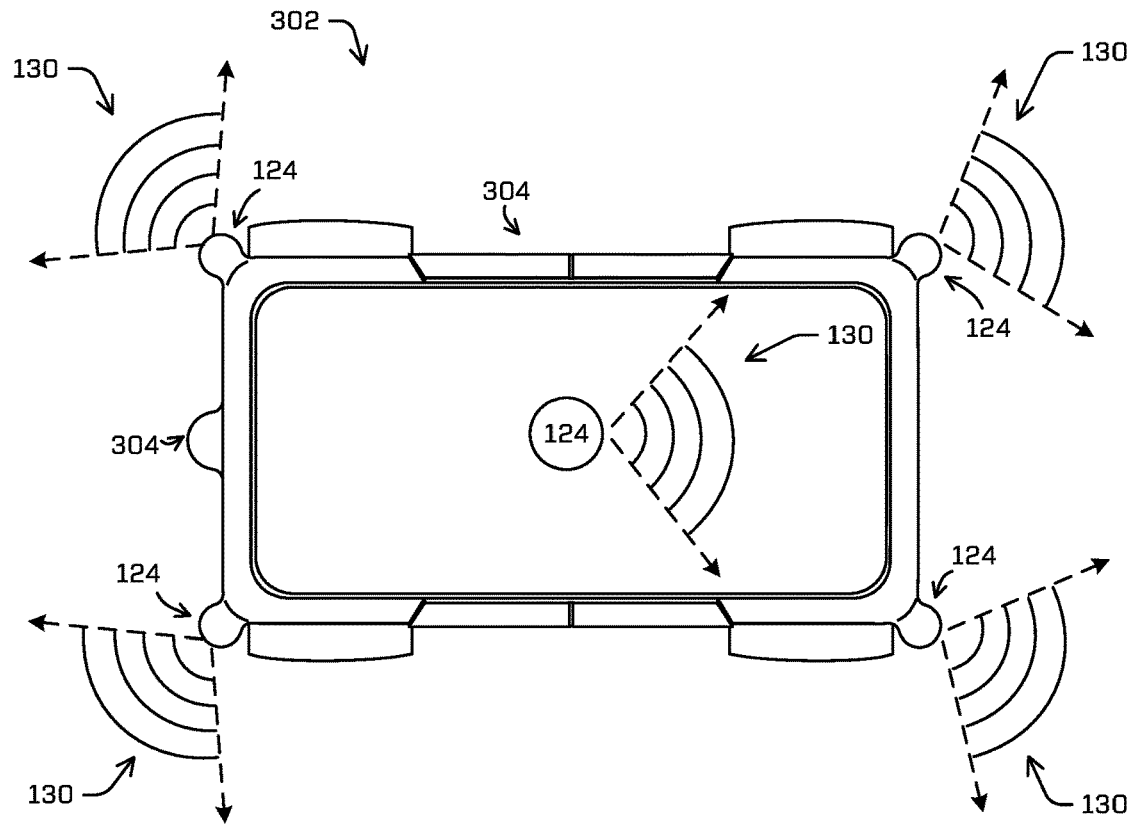
FIG. 3B depicts a top plane view of an example vehicle having multiple sensors mounted to the vehicle.

FIG. 3B depicts a top plane view 302 of the example vehicle 304 having multiple sensors 124 mounted to the vehicle. For example, the sensors 124 can be seen in FIG. 3B. The sensors 124, for example, may be co-located or located proximate to one another but may include different sensor types or modalities, having various fields of view. As may be understood in the context of this disclosure, the vehicle 304 may include any number and any type of sensors. As may be understood in the context of this disclosure, the mounting locations and fields of view may include any number of configurations.

Figure 4:
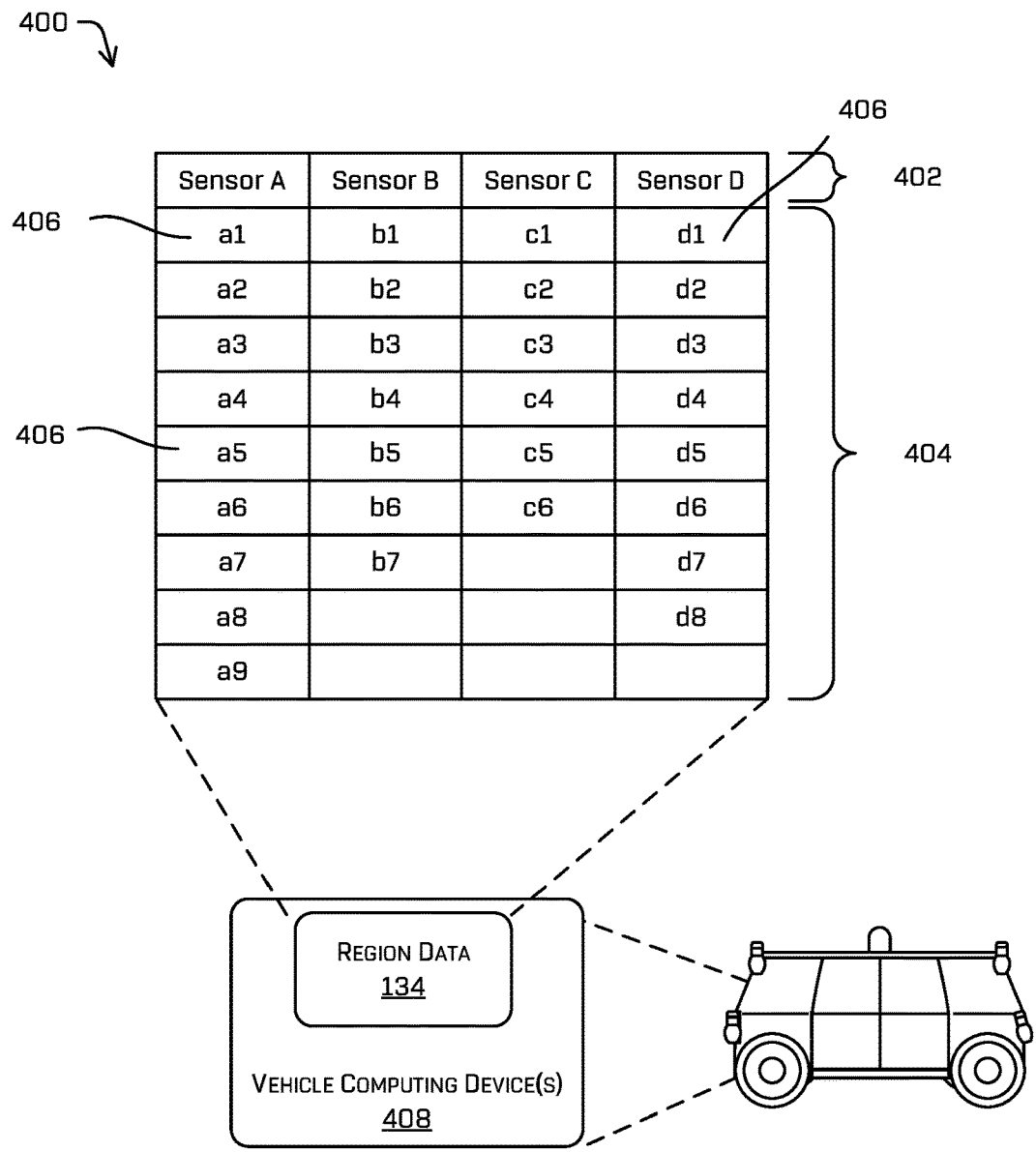
FIG. 4 depicts region data collected from individual sensors of multiple sensors, represented as a table.

FIG. 4 depicts an example data table 400 of a set of data captured by the sensors 124 mounted to a vehicle 104. For example, data columns 402 represent sensor data collected from individual sensors 124 (e.g., Sensor A, Sensor B, Sensor C, and Sensor D). Additionally, for example, data rows 404 represent data points collected by the sensors 124 and/or a distance (e.g., a height) above an assumed plane of the ground surface (e.g., ground surface 132). Referring to FIG. 2, the sets 202, 204, 206, and 208 may refer to the data points in the data rows 404. Thus, for example purposes, each data point 406 may correspond to a single sensor 124 and each data point 406 may also correspond to a height value measured by the sensor 124 as shown in sets 202, 204, 206, and 208 of FIG. 2. Collectively, the set of data may be referred to as region data 134.

The region data 134 can then be provided to a computing device 408 to, for example, process and/or analyze the region data 134 to detect a calibration error associated with one or more sensors.

Figure 5:
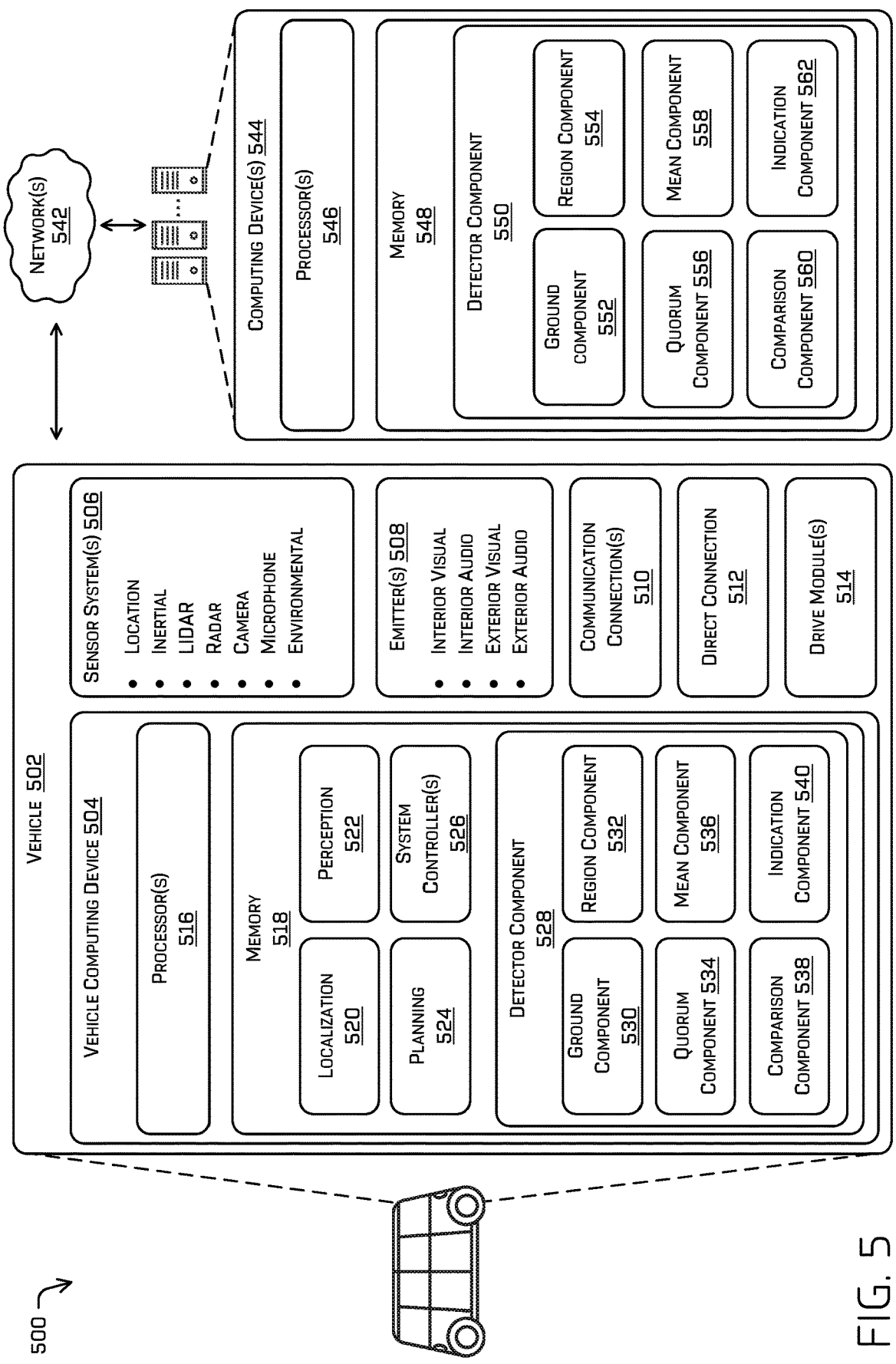
FIG. 5 depicts a block diagram of an example system for implementing the techniques described herein.

FIG. 5 depicts a block diagram of an example system 500 for implementing the techniques described herein. In at least one example, the system 500 can include a vehicle 502, which can be the same vehicle as the vehicles 104 and 304 described above with reference to FIGS. 1, 3A, and 3B.

The vehicle 502 can include a vehicle computing device 504, one or more sensor systems 506, one or more emitters 508, one or more communication connections 510, at least one direct connection 512, and one or more drive modules 514.

The vehicle computing device 504 can include one or more processors 516 and memory 518 communicatively coupled with the one or more processors 516. In the illustrated example, the vehicle 502 is an autonomous vehicle; however, the vehicle 502 can be any other type of vehicle. In the illustrated example, the memory 518 of the vehicle computing device 504 stores a localization component 520, a perception component 522, a planning component 524, one or more system controllers 526, and a detector component 528. Though depicted in FIG. 5 as residing in memory 518 for illustrative purposes, it is contemplated that the localization component 520, the perception component 522, the planning component 524, the one or more system controllers 526, and the detector component 528 may additionally, or alternatively, be accessible to the vehicle 502 (e.g., stored remotely).

In at least one example, the localization component 520 can include functionality to receive data from the sensor system(s) 506 to determine a position of the vehicle 502. For example, the localization component 520 can include and/or request/receive a three-dimensional map of an environment and can continuously determine a location of the autonomous vehicle within the map. In some instances, the localization component 520 can use SLAM (simultaneous localization and mapping) or CLAMS (calibration, localization and mapping, simultaneously) to receive image data, LIDAR data, RADAR data, SONAR data, IMU data, GPS data, wheel encoder data, or any combination thereof, and the like to accurately determine a location of the autonomous vehicle. In some instances, the localization component 520 can provide data to various components of the vehicle 502 to determine an initial position of an autonomous vehicle for generating a candidate trajectory, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 522 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. For example, the planning component 524 can determine various routes and trajectories and various levels of detail. For example, the planning component 524 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique. A single trajectory of the multiple trajectories in a receding horizon having the highest confidence level may be selected to operate the vehicle.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive module(s) 514 and/or other components of the vehicle 502, which may be configured to operate in accordance with a trajectory provided from the planning system 524.

In some instances, the detector component 528 can include functionality to perform detection of a miscalibrated sensor. In some instances, the detector component 528 may receive data from the system controller(s) 526 to determine if the vehicle 502 is traveling at a particular speed. In some instances, the detector component 528 may provide an indication to control the vehicle 502 to travel at a maximum speed or at a minimum speed. In the illustrated example, the detector component 528 includes a ground component 530, a region component 532, a quorum component 534, a mean component 536, a comparison component 538, and an indication component 540.

In at least one example, the ground component 530 can include functionality to determine a region associated with a ground surface of an environment. For example, the perception component 522, after segmentation and/or classification, can provide the sensor data to the ground component 530. In some instances, the ground component 530 can use the data provided by the perception component to isolate the data associated with the ground surface of an environment. As above, the ground component 530 may also select a ground surface based on, for example, a location of the system 500 relative to a map of known ground surfaces, by assuming that regions immediately proximate the vehicle are planar ground surfaces, and the like.

In some instances, the region component 532 can select a portion of data associated with the ground surface of an environment. For example, the region component 532 may overlay a calibration grid to partition the ground surface. Then the region component may select one partition of the calibration grid, and the associated data, for further analysis. In some instances, the data associated with the ground surface can include data collected by the sensors 124, which may comprise one or more RADAR sensors, LIDAR sensors, SONAR sensors, image sensors (e.g., stereo image sensors), time-of-flight (ToF) sensors, or any combination thereof, capable of, for example, measuring distances relative to a surface. In some instances, the region component 532 can include functionality to select a region (e.g., in conjunction with the comparison component 538, discussed below) based on a flatness of the potential region of interest. For example, the region component can compare height values captured by a single sensor within a potential region of interest. In some cases, the region component 532 can determine a difference between a highest height value and a lowest height value. In some instances, if the difference meets or exceeds a threshold value, the region component 532 can reject the potential region of interest, as the region may not be a "flat" region, for the purpose of miscalibration detection. In some instances, the region component 532 can set a size of a region. In one example, a region can be on the order of 50 centimeters by 50 centimeters, although any dimensions can be used.

The quorum component 534 may, in at least one example, determine that a particular set of data satisfies quorum conditions. For example, the quorum component 534 may receive data associated with a partition of a calibration grid (e.g., region data) from the region component 532. The quorum component 534 may then, for example, determine the number of sensors associated with the region data. If the number of sensors associated with the region data does not meet or exceed a threshold number of sensors, the quorum component 534 may provide an indication that sensor quorum has not been met. Additionally, the quorum component 534 may analyze the set of data associated with a single sensor within the region data and determine the number of data points within the set of data. The quorum component 534 may then determine that the set of data associated with a single sensor within the region data does not contain a minimum number of data points, and can also provide an indication that data point quorum has not been met for that particular sensor. If, for example, data point quorum has not been met for a sufficient number of sensors, then the quorum component 534 may then indicate that sensor quorum has also not been met.

As a non-limiting example, the quorum component 534 can set a threshold for a number of sensors at two, three, or any number of sensors. In an example where the threshold is set at three sensors, and where two sets of sensor data are present, the quorum component 534 may indicate that sensor quorum has not been met. In such a scenario, no miscalibration detection may be determined. Additionally, and by way of example, the quorum component 534 may set a threshold number of points (e.g., the data point quorum) at twelve data points per sensor, although any number of data points may be used. Thus, in a situation where a set of sensor data contains eleven data points, the quorum component 534 may indicate that data point quorum has not been met. If data point quorum has not been met, then the sensor data would not contribute to sensor quorum. Thus, for purposes of illustration, where three sets of sensor data are available and one of the sets does not meet data point quorum, then sensor quorum may also not be met if the quorum component 534 requires three sets of sensor data. If, however, four sets of sensor data are available, and one of the sets does not meet data point quorum, then sensor quorum may still be met if the quorum component 534 is set to utilize three sets of sensor data. In such a scenario, a miscalibration detection may be made with respect to the three sensors having sufficient data for analysis.

The mean component 536 can include functionality to calculate an average of a set of values. For example, the mean component 536 can receive data from the region component 532. By way of example only, the data can represent height measurement values (e.g., a distance above or below the ground surface as determined based on the associated sensor data) and the mean component 536 can generate an average height value for the height values. Of course, this example is not meant to be so limiting. As another non-limiting example, an offset value in either of an x- or a y-direction may be determined for each sensor data associated with, for example, walls of buildings, and the like. Additionally, the mean component 536 can provide functionality to calculate a trimmed mean. When calculating a trimmed mean, the mean component 536 can sort the height values and trim (e.g., exclude, omit, disregard, etc.) a portion of the lowest values, trim a portion of the highest values, or trim a portion of both the lowest values and the highest values prior to calculating the trimmed mean. The amount that the mean component 536 trims can be based on a fixed number, a percentage, standard deviations or based on any other calculation deemed sufficient. In some examples, the mean component 536 can store the average values. In other examples, the mean component 536 can transmit the average values to a different component, such as the region component 532 or the comparison component 538.

The comparison component 538 can include functionality to compare values, calculate a difference, and provide an indication if the difference meets or exceeds a threshold value. For example, the comparison component 538 can receive data from the region component 532. As a non-limiting example, comparison component 538 can receive the lowest value associated with a sensor and the highest value associated with a sensor. The comparison component 532 can then provide an indication if the difference meets or exceeds a certain maximum value. For illustration purposes, this indication can imply that the sensor collected data on a non-flat surface.

As another example, the comparison component 538 can receive one or more values from the mean component 536 or from the region component 532. After receiving the values, the comparison component 538 can then calculate a difference between the values. Based on the difference, the comparison component 538 can be configured to provide an indication regarding whether the difference meets or exceeds a threshold value. For illustrative purposes only, the comparison component 538 can receive an average (e.g., mean or trimmed mean) value for one set of data captured by a first sensor. The comparison component 538 can then receive an average of two averages (e.g., the average for a second set of data captured by a second sensor and the average for a third set of data captured by a third sensor). The comparison component 538 can then calculate a difference between the average value associated with the first sensor and the average of the averages, where the averages are associated with the second sensor and the third sensor. In other instances, the comparison component 538 can receive one average value for one set of data captured by a first sensor and another average value for a different set of data captured by a second sensor. The comparison component can then, for example, indicate that the difference meets or exceeds a threshold value. The threshold value can be based on a fixed value, percentage, standard deviation, or based on any other calculation deemed sufficient. In some examples, where more than three sensors are used, a similar technique may be used where an average value of sensor data from one sensor is compared to the average of the average values of the remaining sensors. Such a comparison may generally be referred to as a "one-vs-rest" comparison.

An example of the operations for detecting a miscalibrated sensor is given below. In this example, a region includes data captured by four sensors, Sensor A, Sensor B, Sensor C, and Sensor D. As an initial matter (and as discussed above), the number of sensors is compared to the threshold number of sensors, which in this example, may be three sensors. Additionally, a number of data points captured by each sensor can be compared with a threshold number of data points per sensor. Next, an average height of data captured by each individual sensor can be determined by the mean component 536. In some cases, a trimmed mean can be used, as discussed herein. Thus, the operations can include generating an average height of the data captured by Sensor A (e.g., referred to as "avg_A"). Averages for Sensors B, C, and D can be determined as "avg_B," "avg_C," and "avg_D," respectively. Starting with Sensor A, the average height of the data captured by Sensor A ("avg_A") can be compared against an average height value based on the averages of Sensor B, Sensor C, and Sensor D. That is, the operations can include determining an average of avg_B, avg_C, and avg_D, (e.g., referred to as "avg_BCD") and determining a difference between avg_A and avg_BCD. If the difference meets or exceeds a threshold, an indication can be generated that the sensor A may be miscalibrated. These operations can be performed with respect to Sensor B, Sensor C, and Sensor D to detect whether other sensors are miscalibrated as well.

The indication component 540 can include functionality to determine whether a sensor or whether a set of sensors may not be used as a reference. An example of the operations for determining whether a sensor or whether a set of sensors may not be used as a reference is given below. In this example, the system 500 can select Sensor A for testing. Using the mean component 536, the system can use averages for Sensors B and Sensor C (e.g., referred to as "avg_B" and "avg_C"). Using the comparison component 538, the system 500 can determine that the difference between avg_B and avg_C meets or exceeds a threshold and determine that avg_B and avg_C cannot serve as a reference for Sensor A. Thus, the indication component 540 can provide an indication that the test should not be completed.

In other examples, the indication component 540 can use recorded data to determine whether a sensor is miscalibrated. For illustration purposes only, the system 500 can store and track the number of times a sensor is tested, the number of times a sensor is determined to be miscalibrated, and the number of times a sensor is determined not to be miscalibrated, over a period of time. Thus, the system 500 can analyze the recorded data and determine, for example a quality score. The quality score can indicate a percentage based on the number of indications that a sensor is not miscalibrated and the number of times the sensor is tested. The system 500 can also analyze the recorded data and determine, for example, a test rate or indication rate. The test rate can indicate a percentage based on the number of times the sensor is tested and the total number of tests executed by system 500 for a particular sensor. Such an indication component 540 can amalgamate data from randomly selected ground surfaces as the system 500 completes one or more drives.

An example of determining a test rate is discussed below. As mentioned above, the test rate can be a measure of the number of times a test is completed relative to the number of tests that are initiated for a particular sensor. In the "one v. rest" comparison of averages, the operations can include a check to determine whether the average of the "rest" is a reliable baseline measurement. By way of example, and without limitation, the system 500 can receive data captured by three sensors, Sensor A, Sensor B, and Sensor C, although data from any number of sensors can be received. As discussed herein, in a test of Sensor A, an average of values of data captured by Sensor A (e.g., the average of "one") can be compared against the average of values captured by Sensor B and Sensor C (e.g., the average of the "rest"). In some instances, prior to determining the average of the "rest," individual averages for Sensor B and Sensor C can be compared to determine if the data vary more than a threshold value. That is, if the difference between average values of Sensor B and average values of Sensor C meets or exceeds a threshold, the test may not be performed (e.g., because the average values of Sensor B and Sensor C disagree, they may not provide a reliable value of the "rest"). Accordingly, such a test can be counted as a failed test (e.g., not completed). In such an event, a number of initiated tests for Sensor A would be incremented by one, but a number of completed tests would not be incremented. Accordingly, over time, a test rate can provide insight about whether sensors having co-visibility (e.g., at least partially overlapping fields of view) with Sensor A may be miscalibrated. In some instance, a test rate can be determined as a percentage, although the test rate may be provided as a fraction, or as another statistical representation.

Additionally, the system 500 can determine a quality score by comparing, for a number of completed tests, a number of tests resulting in an indication of no miscalibration relative to the number of completed tests. If the quality score does not meet or exceed a threshold value, an indication can be generated that Sensor A is miscalibrated. These operations can be performed with respect to Sensor B. Sensor C, etc., to detect whether other sensors are miscalibrated as well.

In some instances, the system 500 can provide functionality to use a single test to indicate a warning that a sensor may be miscalibrated. For example, system 500 may generate a warning that sensor A is miscalibrated after the indication component 540 determines that sensor A is miscalibrated. In other instances, system 500 may use a threshold number of tests to indicate a warning that a sensor may be miscalibrated. Additionally, in other instances, the system 500 may use a threshold number of tests to indicate an error that a sensor may be miscalibrated. The system 500 may, by way of example, use the quality score as discussed above, to indicate an error that a sensor may be miscalibrated. The system 500 may, also by way of example, use the test rate, as discussed above, to indicate a warning or an error that a sensor may be miscalibrated. The system 500 may also use a combination of single tests, a threshold number of tests, a quality score, and/or a test rate to indicate a warning and/or an error that a sensor may be miscalibrated.

In some instances, the system 500 may disable a sensor based at least in part on an indication that a sensor is miscalibrated.

In some examples, the detector component 528 may be stored on a remote computing device(s) (such as the computing device(s) 544) accessible via network(s) 542.

In at least one example, the sensor system(s) 506 can include LIDAR sensors, RADAR sensors, ultrasonic transducers, SONAR sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the LIDAR sensors can include individual LIDAR sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device 504. Additionally and/or alternatively, the sensor system(s) 506 can send sensor data, via the one or more networks 542, to the one or more computing device(s) 544 at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive module(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 542. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive modules 514. In some examples, the vehicle 502 can have a single drive module 514. In at least one example, if the vehicle 502 has multiple drive modules 514, individual drive modules 514 can be positioned on opposite ends of the vehicle 502 (e.g., the front and the rear, etc.). In at least one example, the drive module(s) 514 can include one or more sensor systems to detect conditions of the drive module(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 514. In some cases, the sensor system(s) on the drive module(s) 514 can overlap or supplement corresponding systems of the vehicle 502 (e.g., sensor system(s) 506).

The drive module(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive module(s) 514 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 514. Furthermore, the drive module(s) 514 also include one or more communication connection(s) that enable communication by the respective drive module with one or more other local or remote computing device(s).

In at least one example, the localization component 520, perception component 522, and/or the planning component 524 can process sensor data, as described above, and can send their respective outputs, over the one or more network(s) 542, to one or more computing device(s) 544. In at least one example, the localization component 520, the perception component 522, the planning component 524, and/or the detector component 528 can send their respective outputs to the one or more computing device(s) 544 at a particular frequency, after a lapse of a predetermined period of time, in near real-time, etc.

The vehicle 502 can send sensor data to one or more computing device(s) 544, via the network(s) 542. In some examples, the vehicle 502 can send raw sensor data to the computing device(s) 544. In other examples, the vehicle 502 can send processed sensor data and/or representations of sensor data to the computing device(s) 544. In some examples, the vehicle 502 can send sensor data to the computing device(s) 544 at a particular frequency, after a lapse of a predetermined period of time, in near real-time, etc. In some cases, the vehicle 502 can send sensor data (raw or processed) to the computing device(s) 544 as one or more log files.

The computing device(s) 544 can receive the sensor data (raw or processed) and can generate and/or update maps based on the sensor data. Further, the computing device(s) 544 can analyze the received sensor data to determine if one or more sensors of the vehicle 502 are miscalibrated. In at least one example, the computing device(s) 544 can include one or more processors 546 and memory 548 communicatively coupled with the one or more processors 546. In the illustrated example, the memory 548 of the computing device(s) 544 stores detector component 550, which comprises ground component 552, region component 554, quorum component 556, mean component 558, comparison component 560, and indication component 562.

In general, the detector component 550 can receive data from one or more vehicles (such as the vehicle 502) and can detect a miscalibrated sensor. As can be understood, the detector component 550 and components included therein can correspond in functionality discussed in connection with the detector component 528.

The processor(s) 516 of the vehicle 502 and the processor(s) 546 of the computing device(s) 544 can be any suitable processor capable of executing instructions to process data and perform operations as described herein. By way of example and not limitation, the processor(s) 516 and 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and memory 548 are examples of non-transitory computer-readable media. Memory 518 and memory 548 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 544 and/or components of the computing device(s) 544 can be associated with the vehicle 502. That is, the vehicle 502 can perform one or more of the functions associated with the computing device(s) 544, and vice versa.

Figure 6:
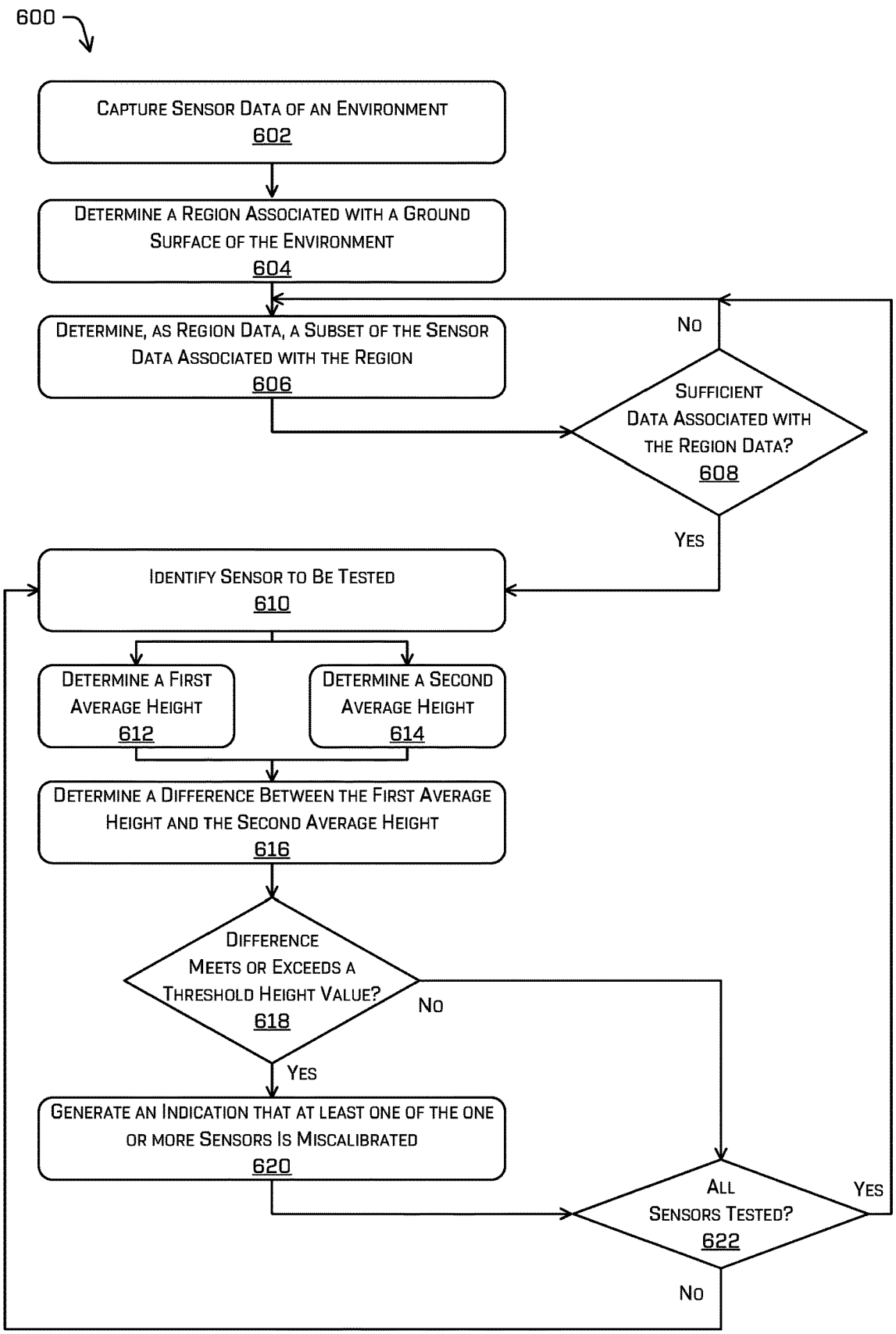
FIG. 6 depicts an example process for detecting a miscalibrated sensor.

FIG. 6 depicts an example process for determining a miscalibrated sensor, as discussed herein. For example, some or all of the process 600 can be performed by one or more components in FIG. 5, as described herein. For example, some or all of the process 600 can be performed by the detector component 528, 550.

At operation 602, the process can include capturing sensor data of an environment. In some instances, the sensor data may be captured by sensor systems 506.

At operation 604, the process can include determining a region associated with a ground surface of the environment. In some instances, the ground component 530, 552 may determine the region associated with a ground surface. In other instances, the localization component 520 and/or the perception component 522 may provide segmentation and classification data which may determine a region associated with a ground surface. In other instances, the vehicle 502 may receive segmentation and classification data via the one or more networks 542 which may determine a region associated with a ground surface. Additionally, or alternatively, such regions may be identified by, for example, locations in a map relative to the vehicle indicated as being known ground surfaces, by approximation that regions proximate the vehicle (and/or over which the vehicle travels) are ground surfaces, and the like.

At operation 606, the process can include determining, as region data, a subset of the sensor data associated with the region. In some instances, the region data may indicate a one or more data points which may be associated with one or more sensors. In some instances, operation 606 may use a calibration grid to partition the region associated with a ground surface into a plurality of partitions for calibration. Operation 606 may then, in some instances, select a single partition and determine the region data associated with the partition.

At operation 608, the process can include executing a check for sufficient data associated with the region data. In some instances, the region data may not have enough sensors associated with the region data. In other instances, the region data may not have enough data points associated with a particular sensor. In some instances, the region data may not be associated with a flat surface, and thus, may include insufficient data. In some instances where the region data contains insufficient data, the process 600 may return to operation 606 to determine, as different region data, a subset of the sensor data associated with the region. In some instances where the region data contains sufficient data, the process 600 may proceed to operation 610. In some instances, operation 608 may discard a portion of the data and/or remove one or more sensors from being tested for miscalibration (e.g., if a single sensor does not meet or exceed a threshold number of points).

At operation 610, the process can include identifying a sensor to be tested. In some instances, identifying a sensor to be tested includes identifying a sensor associated with the region data.

At operation 612, the process can include determining a first average height. In some instances, the first average height may be associated with the sensor identified to be tested. In some instances, the first average height can be determined as a trimmed mean, as discussed herein.

At operation 614, the process can include determining a second average height. In some instances, the second average height may be associated with one or more reference sensors to be tested against. In a case where the one or more references sensors include at least two sensors, the operation 614 can include determining whether an average height of sensor data captured by a first reference sensor is within a threshold value of an average height of sensor data captured by a second reference sensor. That is, the operation 614 can include an internal check to ensure that the data captured by the reference sensors is appropriate for detecting a miscalibrated sensor.

In an example of a "one v. rest" comparison, the operation 612 can refer to determining the average of the "one," while the operation 614 can refer to determining the average of the "rest."

Operations 612 and 614 may occur in parallel or sequentially. Additionally, operations 612 and 614 may occur sequentially with 612 occurring first or 614 occurring first.

At operation 616, the process can include determining a difference between the first average height and the second average height.

At operation 618, the process can include determining whether the difference meets or exceeds a threshold height value. In some instances, the difference will meet or exceed a threshold height value and proceed to operation 620. In other instances, the difference may not meet or exceed a threshold height value, and the process may proceed to operation 622.

At operation 620, the process can include generating an indication that at least one of the one or more sensors is miscalibrated. As discussed herein, the indication may represent a warning or an error. Additionally, as discussed herein, the indication may be based on a single test or a plurality of tests and may be based on stored test result data and analysis of the stored test result data.

At operation 622, the process can execute a check for whether all sensors have been tested for a particular set of region data. In some instances, the process may return to operation 610 if all sensors have not been tested. In other instances, the process may return to operation 606 to select another set of region data if all sensors have been tested. Further, in some instances, if all the sensors have been tested in the operation 622, the process can return to the operation 602 to capture or receive more sensor data of the environment.

Figure 7:
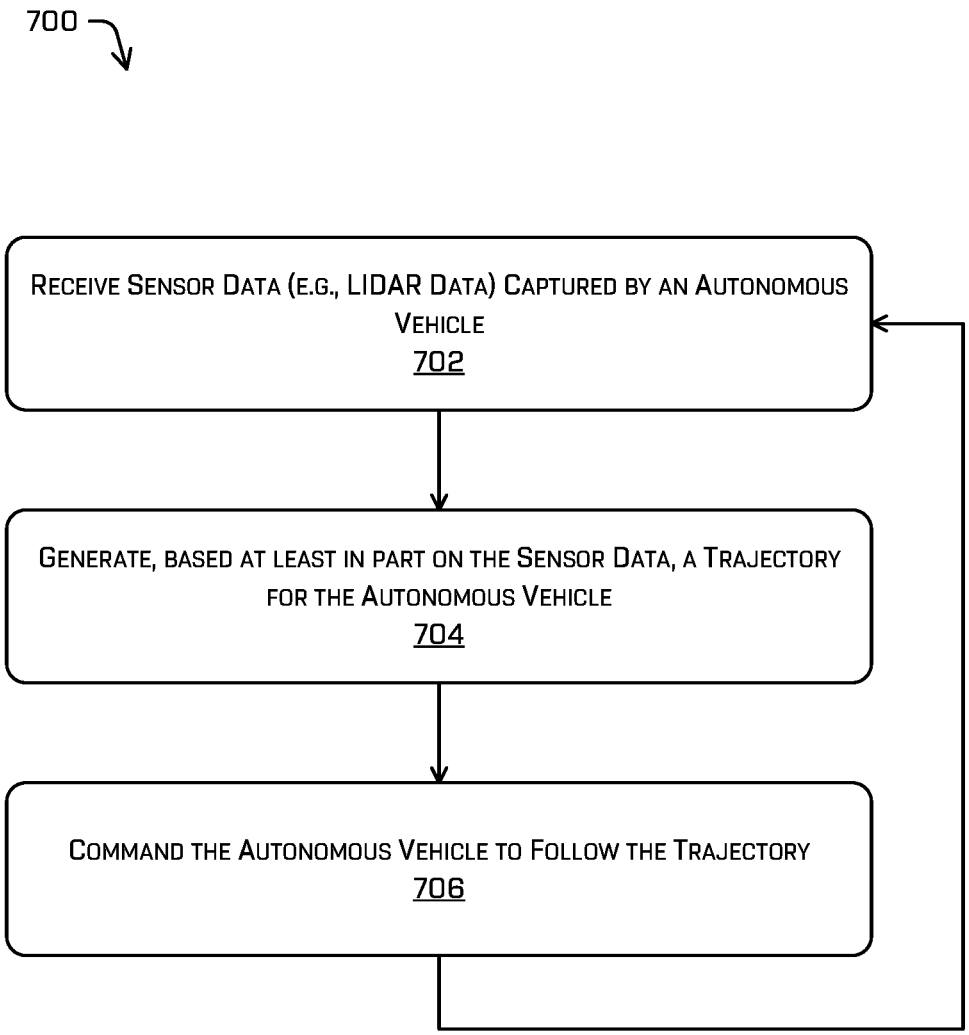
FIG. 7 depicts an example process for commanding an autonomous vehicle based at least in part on LIDAR data.

FIG. 7 depicts an example process 700 for commanding an autonomous vehicle based at least in part on a location based on sensor data (e.g., LIDAR data), as discussed herein. For example, some or all of the process 700 can be performed by one or more components in FIG. 5, as described herein. For example, some or all of the process 700 can be performed by the one or more components of the vehicle 502.

At operation 702, the process can include receiving sensor data captured by an autonomous vehicle. In some instances, the sensor data can be received by the vehicle 502 for determining a region associated with a ground surface of the environment.

At operation 704, the process can include generating, based at least in part on the sensor data, a trajectory for the autonomous vehicle.

At operation 706, the process can include commanding the autonomous vehicle to follow the trajectory. In some instances, the operation 706 can include generating a route, trajectory, and/or control signals to one or more systems of the autonomous vehicle to navigate the autonomous vehicle within the environment.

Example Clauses

A. A method for detecting a miscalibrated sensor, the method comprising: capturing sensor data of an environment using a plurality of sensors disposed about an autonomous vehicle, the sensor data comprising first light detecting and ranging (LIDAR) data associated with a first LIDAR sensor, second LIDAR data associated with a second LIDAR sensor, and third LIDAR data associated with a third LIDAR sensor; determining a region associated with a ground surface of the environment; determining, as region data, a subset of data of the sensor data associated with the region; determining that the region data corresponds to a flat surface; determining a first average height of a first subset of the region data, the first subset comprising first data associated with the first LIDAR data; determining a second average height of a second subset of the region data, the second subset comprising second data associated with the second LIDAR data and the third LIDAR data; determining a difference between the first average height and the second average height; determining that the difference meets or exceeds a threshold height value; and generating an indication that a sensor is miscalibrated.

B: The method of paragraph A, further comprising: determining, based at least in part on the indication, that the first LIDAR sensor is miscalibrated; generating, based at least in part on the second LIDAR data and the third LIDAR data, a trajectory; and controlling, based at least in part on the trajectory, the autonomous vehicle.

C: The method of paragraph A or B, further comprising: receiving segmentation information associated with the sensor data; and determining, based at least in part on the segmentation information, that the region is associated with the ground surface of the environment.

D: The method of any of paragraphs A-C, further comprising: determining that the first subset meets or exceeds a threshold number of data values.

E: The method of any of paragraphs A-D, further comprising: determining a third average height of a third subset of the region data, the third subset comprising third data associated with the second LIDAR data; determining a fourth average height of a fourth subset of the region data, the fourth subset comprising the first LIDAR data and the third LIDAR data; determining a second difference between the third average height and the fourth average height; and determining that the second difference meets or exceeds the threshold height value; and generating a second indication that a second sensor is miscalibrated.

F: A system comprising: one or more processors; and one or more computer-readable media storing instructions executable by the one or more processors, wherein executing the instructions causes the system to: receive sensor data of an environment from a plurality of sensors disposed about a vehicle; determine, as region data, a subset of data of the sensor data; determine a first average value of a first subset of the region data, the first subset captured by a first sensor of the plurality of sensors; determine a second average value of a second subset of the region data, the second subset captured by at least a second sensor and a third sensor of the plurality of sensors; determine a difference between the first average value and the second average value; determine that the difference meets or exceeds a threshold; and generate an indication that the first sensor is miscalibrated.

G: The system of paragraph F, wherein the plurality of sensors is a plurality of light detection and ranging (LIDAR) sensors.

H: The system of paragraph F or G, wherein the sensor data represents data captured by three or more sensors.

I: The system of any of paragraphs F-H, wherein the instructions, when executed, further cause the system to: determine a third average value of a third subset of the region data, the third subset captured by the second sensor; determine a fourth average value of a fourth subset of the region data, the fourth subset captured by the first sensor and the third sensor; determine a second difference between the third average value and the fourth average value; and determine that the second difference meets or exceeds the threshold; and generate a second indication that the second sensor is miscalibrated.

J: The system of any of paragraphs F-I, wherein the instructions further cause the system to: determine, for the first subset of the region data, a highest value; determine, for the first subset of the region data, a lowest value; determine a value difference between the highest value and the lowest value; determine that the value difference is less than or equal to a threshold; and determine, based at least in part on the value difference meeting or exceeding the threshold, that the region data corresponds to a flat surface.

K: The system of any of paragraphs F-J, wherein the instructions further cause the system to: receive segmentation information associated with the sensor data; and determine, based at least in part on the segmentation information, that the region data corresponds to a ground surface.

L: The system of any of paragraphs F-K, wherein the instructions, when executed, further cause the system to: determine that the first subset of the region data meets or exceeds a threshold number of data values.

M: The system of any of paragraphs F-L, wherein the vehicle is an autonomous vehicle, and further wherein the instructions, when executed, further cause the system to: determine, based at least in part on the indication, that the first sensor is miscalibrated; generate, based at least in part on the second sensor and the third sensor, a signal configured to cause the autonomous vehicle to traverse a trajectory; and transmit the signal to the autonomous vehicle.

N: The system of any of paragraphs F-M, wherein the instructions, when executed, further cause the system to: increment a count of a number of tests attempted; determine a second sensor average of data associated with the second sensor; determine a third sensor average of data associated with the third sensor; determine a sensor average difference between the second sensor average and the third sensor average; determine the sensor average difference does not exceed a threshold; and increment a count of a number of tests successfully performed.

O: The system of paragraph N, wherein the instructions further cause the system to: generate a quality score associated with a sensor of the plurality of sensors, wherein the quality score represents a ratio of the number of tests successfully performed to the number of tests attempted.

P: A non-transitory computer-readable medium storing instructions that, when executed, cause one or more processors to perform operations comprising: capturing sensor data of an environment using a plurality of sensors of a vehicle; determining, as region data, a subset of data of the sensor data; determining a first average value of a first subset of the region data, the first subset associated with a first sensor of the plurality of sensors; determining a second average value of a second subset of the region data, the second subset associated with a second sensor of the plurality of sensors;

determining a difference between the first average value and the second average value; determining that the difference meets or exceeds a threshold value; and generating an indication that a sensor of plurality of sensors is miscalibrated.

Q: The non-transitory computer-readable storage medium of paragraph P, wherein the operations further comprise: generating a test rate, the test rate indicative of a number of times the difference is determined; and generating a success rate, the success rate indicative of a number of times the difference is less than or equal to the threshold value.

R: The non-transitory computer-readable storage medium of paragraph P or Q, wherein the operations further comprise: disabling, based at least in part on the indication, a sensor of the plurality of sensors, wherein disabling a sensor comprises indicating a subset of the plurality of sensors as active sensors.

S: The non-transitory computer-readable storage medium of paragraph R, wherein the operations further comprise: generating, based at least in part on sensor data captured from one or more active sensors, a signal configured to cause an autonomous vehicle to traverse a trajectory; and transmitting the signal to the autonomous vehicle.

T: The non-transitory computer-readable storage medium of any of paragraphs P-S, wherein operations further comprise: determining, for the first subset of the region data, a highest value; determining, for the first subset of the region data, a lowest value; determining a value difference between the highest value and the lowest value; determining that the value difference is less than or equal to a threshold; and determining, based at least in part on the value difference, that the region data corresponds to a flat surface.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures can also be executed in different orders. Additionally, various computations that are herein need not be performed in the order disclosed, and other examples using alternative orderings of the computations can be readily implemented. In addition to being reordered, the computations can also be decomposed into sub-computations with the same results.

What is claimed is:

1. A method for detecting a miscalibrated sensor, the method comprising:
capturing sensor data of an environment using a plurality of sensors disposed about an autonomous vehicle, the sensor data comprising first light detecting and ranging (LIDAR) data associated with a first LIDAR sensor, second LIDAR data associated with a second LIDAR sensor, and third LIDAR data associated with a third LIDAR sensor;
determining a region associated with a ground surface of the environment;
determining, as region data, a subset of data of the sensor data associated with the region;
determining that the region data corresponds to a flat surface;
determining a first average height of a first subset of the region data associated with a first portion of the region, the first subset comprising first data associated with the first LIDAR data;
determining a second average height of a second subset of the region data associated with a second portion of the region, wherein at least a part of the first portion is different than the second portion, the second subset comprising second data associated with the second LIDAR data and the third LIDAR data;
determining a difference between the first average height and the second average height;
determining that the difference meets or exceeds a threshold height value; and
generating an indication that a sensor is miscalibrated.

2. The method of claim 1, further comprising:
determining, based at least in part on the indication, that the first LIDAR sensor is miscalibrated;
generating, based at least in part on the second LIDAR data and the third LIDAR data, a trajectory; and
controlling, based at least in part on the trajectory, the autonomous vehicle.

3. The method of claim 1, further comprising:
receiving segmentation information associated with the sensor data; and
determining, based at least in part on the segmentation information, that the region is associated with the ground surface of the environment.

4. The method of claim 1, further comprising:
determining that the first subset meets or exceeds a threshold number of data values.

5. The method of claim 1, further comprising:
determining a third average height of a third subset of the region data, the third subset comprising third data associated with the second LIDAR data;
determining a fourth average height of a fourth subset of the region data, the fourth subset comprising the first LIDAR data and the third LIDAR data;
determining a second difference between the third average height and the fourth average height; and
determining that the second difference meets or exceeds the threshold height value; and
generating a second indication that a second sensor is miscalibrated.

6. A system comprising:
one or more processors; and
one or more computer-readable media storing instructions executable by the one or more processors, wherein executing the instructions causes the system to:
receive sensor data of an environment from a plurality of sensors disposed about a vehicle;
determine, as region data, a subset of data of the sensor data associated with a region of the environment proximate the vehicle;

determine a first average height of a first subset of the region data associated with a first portion of the region, the first subset captured by a first sensor of the plurality of sensors;
determine a second average height of a second subset of the region data associated with a second portion of the region, wherein at least a part of the first portion is different than the second portion, the second subset captured by at least a second sensor and a third sensor of the plurality of sensors;
determine a difference between the first average height and the second average height;
determine that the difference meets or exceeds a threshold; and
generate an indication that the first sensor is miscalibrated.

7. The system of claim 6, wherein the sensor data represents data captured by three or more sensors.

8. The system of claim 6, wherein the instructions, when executed, further cause the system to:
determine a third average height of a third subset of the region data, the third subset captured by the second sensor;
determine a fourth average height of a fourth subset of the region data, the fourth subset captured by the first sensor and the third sensor;
determine a second difference between the third average height and the fourth average height; and
determine that the second difference meets or exceeds the threshold; and
generate a second indication that the second sensor is miscalibrated.

9. The system of claim 6, wherein the instructions further cause the system to:
determine, for the first subset of the region data, a highest value;
determine, for the first subset of the region data, a lowest value;
determine a value difference between the highest value and the lowest value;
determine that the value difference is less than or equal to a threshold; and
determine, based at least in part on the value difference meeting or exceeding the threshold, that the region data corresponds to a flat surface.

10. The system of claim 6, wherein the instructions further cause the system to:
receive segmentation information associated with the sensor data; and
determine, based at least in part on the segmentation information, that the region data corresponds to a ground surface.

11. The system of claim 6, wherein the instructions, when executed, further cause the system to:
determine that the first subset of the region data meets or exceeds a threshold number of data values.

12. The system of claim 6, wherein the vehicle is an autonomous vehicle, and further wherein the instructions, when executed, further cause the system to:
determine, based at least in part on the indication, that the first sensor is miscalibrated;
generate, based at least in part on the second sensor and the third sensor, a signal configured to cause the autonomous vehicle to traverse a trajectory; and
transmit the signal to the autonomous vehicle.

13. The system of claim 6, wherein the instructions, when executed, further cause the system to:

increment a count of a number of tests attempted;
determine a second sensor average of data associated with the second sensor;
determine a third sensor average of data associated with the third sensor;
determine a sensor average difference between the second sensor average and the third sensor average;
determine the sensor average difference does not exceed a threshold; and
increment a count of a number of tests successfully performed.

14. The system of claim 13, wherein the instructions further cause the system to:
generate a quality score associated with a sensor of the plurality of sensors, wherein the quality score represents a ratio of the number of tests successfully performed to the number of tests attempted.

15. The system of claim 6, wherein the instructions, when executed, further cause the system to:
determine that the region data corresponds to a flat surface.

16. A non-transitory computer-readable medium storing instructions that, when executed, cause one or more processors to perform operations comprising:
capturing sensor data of an environment using a plurality of sensors of a vehicle;
determining, as region data, a subset of data of the sensor data associated with a region of the environment proximate the vehicle;
determining a first average height of a first subset of the region data associated with a first portion of the region, the first subset associated with a first sensor of the plurality of sensors;
determining a second average height of a second subset of the region data associated with a second portion of the region, wherein at least a part of the first portion is different than the second portion, the second subset associated with a second sensor of the plurality of sensors;
determining a difference between the first average height and the second average height;
determining that the difference meets or exceeds a threshold value; and
generating an indication that a sensor of plurality of sensors is miscalibrated.

17. The non-transitory computer-readable storage medium of claim 16, wherein the operations further comprise:
generating a test rate, the test rate indicative of a number of times the difference is determined; and
generating a success rate, the success rate indicative of a number of times the difference is less than or equal to the threshold value.

18. The non-transitory computer-readable storage medium of claim 16, wherein the operations further comprise:
disabling, based at least in part on the indication, a sensor of the plurality of sensors,
wherein disabling a sensor comprises indicating a subset of the plurality of sensors as active sensors.

19. The non-transitory computer-readable storage medium of claim 18, wherein the operations further comprise:
generating, based at least in part on sensor data captured from one or more active sensors, a signal configured to cause an autonomous vehicle to traverse a trajectory; and
transmitting the signal to the autonomous vehicle.

20. The non-transitory computer-readable storage medium of claim 16, wherein operations further comprise:
- determining, for the first subset of the region data, a highest value;
- determining, for the first subset of the region data, a lowest value;
- determining a value difference between the highest value and the lowest value;
- determining that the value difference is less than or equal to a threshold; and
- determining, based at least in part on the value difference, that the region data corresponds to a flat surface.

* * * * *